(12) United States Patent
Wacker et al.

(10) Patent No.: US 8,983,632 B2
(45) Date of Patent: Mar. 17, 2015

(54) FUNCTION BLOCK EXECUTION FRAMEWORK

(75) Inventors: Paul Wacker, Plymouth, MN (US); Ralph Collins Brindle, Edina, MN (US); Shilpa Anand, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 382 days.

(21) Appl. No.: 13/074,627

(22) Filed: Mar. 29, 2011

(65) Prior Publication Data

US 2012/0253482 A1    Oct. 4, 2012

(51) Int. Cl.
| | |
|---|---|
| G05B 11/01 | (2006.01) |
| G06F 9/455 | (2006.01) |
| G05B 19/042 | (2006.01) |
| G06F 1/32 | (2006.01) |
| G06F 9/48 | (2006.01) |
| G06F 17/50 | (2006.01) |

(52) U.S. Cl.
CPC ............. *G05B 19/042* (2013.01); *G06F 1/329* (2013.01); *G06F 9/4881* (2013.01)
USPC .................. 700/22; 703/14; 703/15; 703/16; 703/17; 703/18; 703/19; 716/108; 716/112

(58) Field of Classification Search
USPC ................. 700/22; 716/108, 112; 703/14–19
See application file for complete search history.

(56) References Cited

U.S. PATENT DOCUMENTS

| | | | | |
|---|---|---|---|---|
| 3,913,070 A | * | 10/1975 | Malcolm et al. | 718/104 |
| 4,318,173 A | * | 3/1982 | Freedman et al. | 718/103 |
| 4,574,359 A | * | 3/1986 | Ishizaka et al. | 702/131 |
| 5,386,562 A | * | 1/1995 | Jain et al. | 717/160 |
| 5,396,616 A | * | 3/1995 | Venable | 703/27 |
| 5,455,499 A | * | 10/1995 | Uskali et al. | 340/636.1 |
| 5,557,795 A | * | 9/1996 | Venable | 718/100 |
| 5,598,566 A | * | 1/1997 | Pascucci et al. | 713/324 |
| 5,606,242 A | * | 2/1997 | Hull et al. | 320/106 |
| 5,748,631 A | * | 5/1998 | Bergantino et al. | 370/398 |
| 5,835,898 A | * | 11/1998 | Borg et al. | 705/7.12 |
| 5,978,831 A | * | 11/1999 | Ahamed et al. | 718/105 |
| 6,239,579 B1 | * | 5/2001 | Dunn et al. | 320/121 |

(Continued)

OTHER PUBLICATIONS

Zhang et al., "Runtime Adaptability of a Concurrent Function Block Model for a Real-Time Holonic Controller", IEEE , 2001, pp. 1-64-168.*

(Continued)

*Primary Examiner* — Robert Fennema
*Assistant Examiner* — Thomas Stevens
(74) *Attorney, Agent, or Firm* — Seager Tufte & Wickhem LLC.

(57) ABSTRACT

A system having a function block execution framework. Function blocks may be for use in a control system design. These blocks may be selected from a library of a function block engine. Selected function blocks may be executed for operational purposes. They may be continuously executed by a processor to maintain operational status. However, since a function block engine and a resulting system of function blocks may be operated with battery power, executions of function blocks may be reduced by scheduling the executions of function blocks to times only when they are needed. That means that the processor would not necessarily have to operate continuously to maintain continual execution of the function blocks and thus could significantly reduce consumption of battery power.

14 Claims, 10 Drawing Sheets

(56) References Cited

U.S. PATENT DOCUMENTS

| | | | |
|---|---|---|---|
| 6,285,966 B1* | 9/2001 | Brown et al. | 702/188 |
| 6,311,081 B1* | 10/2001 | Northcutt et al. | 455/574 |
| 6,738,388 B1* | 5/2004 | Stevenson et al. | 370/465 |
| 6,745,222 B1* | 6/2004 | Jones et al. | 718/107 |
| 6,766,508 B1* | 7/2004 | Isham | 717/116 |
| 6,850,966 B2* | 2/2005 | Matsuura et al. | 709/203 |
| 6,851,621 B1* | 2/2005 | Wacker et al. | 236/51 |
| 6,912,671 B2* | 6/2005 | Christensen et al. | 714/25 |
| 7,302,685 B2* | 11/2007 | Binns et al. | 718/103 |
| 7,653,459 B2 | 1/2010 | Pouchak et al. | |
| 7,668,936 B1* | 2/2010 | Krikorian et al. | 709/219 |
| 7,723,951 B2* | 5/2010 | Poisner | 320/112 |
| 7,818,748 B2* | 10/2010 | Liu | 718/102 |
| 7,826,929 B2 | 11/2010 | Wacker | |
| 2001/0001532 A1* | 5/2001 | Galbraith et al. | 320/132 |
| 2001/0047434 A1* | 11/2001 | Liu | 709/253 |
| 2003/0014536 A1* | 1/2003 | Christensen et al. | 709/238 |
| 2004/0153594 A1* | 8/2004 | Rotvold et al. | 710/305 |
| 2004/0194101 A1* | 9/2004 | Glanzer et al. | 718/100 |
| 2004/0230323 A1* | 11/2004 | Glanzer et al. | 700/18 |
| 2005/0040249 A1* | 2/2005 | Wacker et al. | 236/51 |
| 2006/0005191 A1* | 1/2006 | Boehm | 718/100 |
| 2006/0139681 A1* | 6/2006 | Walmsley | 358/1.14 |
| 2007/0271570 A1* | 11/2007 | Brown et al. | 718/105 |
| 2008/0004725 A1 | 1/2008 | Wacker | |
| 2008/0010049 A1* | 1/2008 | Pouchak et al. | 703/14 |
| 2008/0016493 A1 | 1/2008 | Pouchak et al. | |
| 2009/0113037 A1 | 4/2009 | Pouchak | |
| 2011/0025124 A1* | 2/2011 | Brabec | 307/9.1 |

OTHER PUBLICATIONS

Kuo et al., "Determining the Worst-Case Reaction Time of IEC 61499 Function Blocks" IEEE, Jul. 13-16, 2010, pp. 1104-1109.*

* cited by examiner

| BASE RATE MULTIPLIER # | SEQUENCE # | BEGINNING BLOCK # | ENDING BLOCK # |
|---|---|---|---|
| 1 | 0 | XX | XX |
| 2 | 0 | XX | XX |
| 2 | 1 | XX | XX |
| 3 | 0 | XX | XX |
| 3 | 1 | XX | XX |
| 3 | 2 | XX | XX |
| ... | ... | ... | ... |

FUNCTION BLOCK EXECUTION FRAMEWORK

BACKGROUND

The present disclosure pertains to control system designs and particularly to control system designs implementing function blocks. More particularly, the disclosure pertains to execution of the function blocks.

SUMMARY

The disclosure reveals a system having a function block execution framework. Function blocks may be for use in a control system design. These blocks may be selected from a library by a function block engine. Selected function blocks may be executed for operational purposes. They may be continuously executed by a processor to maintain operational status. However, since a function block engine and a resulting control system of function blocks may be operated with battery power, executions of function blocks may be reduced by scheduling the executions of function blocks to times only when they are needed. That means that the processor would not necessarily have to operate continuously to maintain continual execution of the function blocks and thus could significantly reduce consumption of battery power.

DESCRIPTION

There may be a frequent need in battery operated devices to reduce the execution time of the control logic and thus reduce battery consumption. Running the entire control logic every time the task is called may keep the processor running continuously and reduce the battery life significantly in residential and light commercial applications. Limiting the execution to only the required function blocks each time the task is called may significantly reduce battery consumption.

The present approach may provide a way to distribute the control logic into separate blocks executed at different periods in time. Unrelated control algorithms, such as those of temperature, humidity and ventilation control, may be divided into separate time slots for execution. A purpose of the present framework may be to allow an application developer to separately control the execution rates of different subsets of blocks within a larger application.

Figure 1:
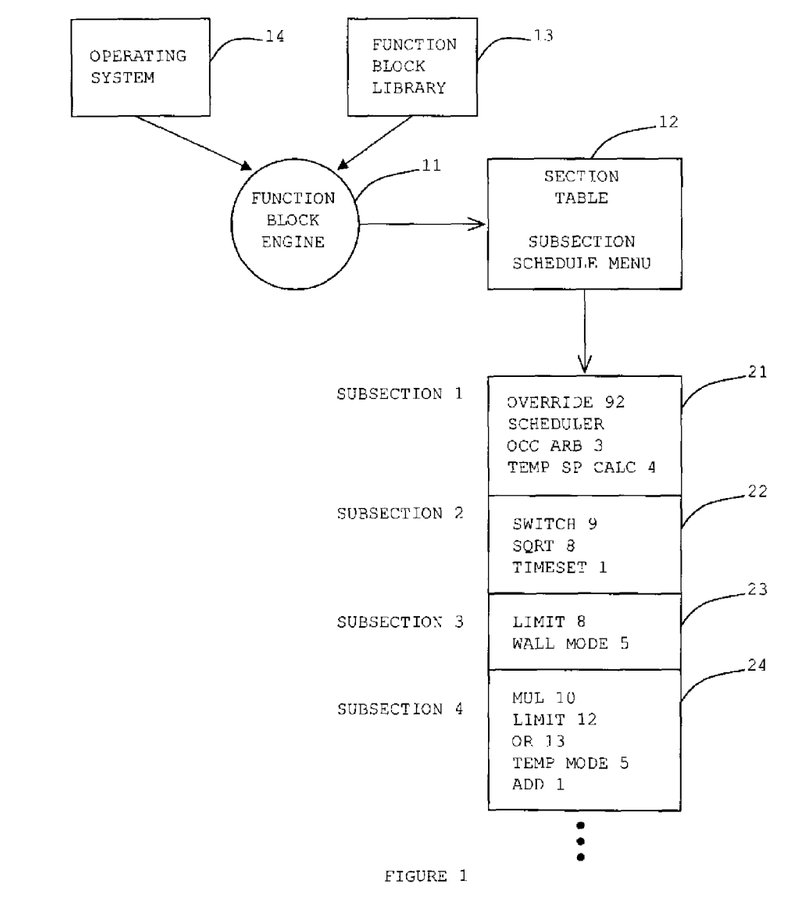
FIG. 1 is a diagram of a layout of the present system for the function block periodic execution framework.

FIG. 1 is a diagram of a layout of the present system for the function block periodic execution framework. Function block engine 11 may be connected to a table 12. An operating system 14 may provide interface and management of function block engine 11. Function block engine may select function blocks from a library 13 for control logic and/or logic designs laid out with function block engine 11.

Function block engine 11, used for designs using function blocks may provide information as to the function blocks being utilized by the engine to a table 12 for determining a list of such blocks. Table 12 may be where execution times of the function blocks may be scheduled and effected. The list of the function blocks for execution may be regarded as a "section" or "set". The terms may be used interchangeably. Proportional lists of the function blocks may be regarded as subsections or subsets, respectively. The subsets may be determined in accordance with execution time cycles. That is, a function block needs to be maintained in an active operating state for the purpose of design and simulation of the designs incorporating the respective function block.

A function block may be executed to effect its operation. The function block may need to be executed again to maintain its operation within a certain amount of time. This amount of time may be regarded as a minimum time of that particular function block. Various function blocks may differ in terms of minimum times. Of the active function blocks listed in table 12, the shortest minimum time of all of these function blocks may be regarded as a base time. Function blocks have longer minimum times may be executed less frequently than other function blocks. The list or set of function blocks may be categorized into several subsections or subsets of function blocks according to their minimum times between continual executions required for sustaining continuous operation by the function blocks. An example of a categorization of function blocks may be illustrated by subsections 21, 22, 23 and 24. Subsection 21 may list function blocks "override 92", "scheduler", "OCC ARB 3" and "Temp SP calc 4". Subsection 22 may list function blocks "Switch 9", "SQRT 8" and "Timeset 1". Subsection 23 may list function blocs "Limit 8" and "Wall Mode 5", and subsection 24 may list "MUL 10", "Limit 12", "OR 13", "Temp Mode 5" and "Add 1". Additional subsections may list function blocks. The flexibility of executing function blocks right at their minimum execution renewal times may save a maximum amount of energy. However, for purposes of simplification, brackets of time may be established for different groups of function blocks which may be effected with the subsections. For instance, there may be a number of function blocks that have minimum times of 5, 7, 9, 13, 14, 17, 19 and 21 seconds, respectively. An execution approach might assure that the noted example function blocks may be executed repeatedly every 5, 7, 9, 13, 14, 17, 19 and 21 seconds, as long as the function blocks are to be maintained. However, this repetition of individual times for each of the individual function blocks may result in a very efficient saving of execution energy, which appears to be much better than executing all of the function blocks every 5 seconds. However, this approach may be somewhat more complicated than grouping the function block execution times into groups where function block execution times are classified into a range such that executions for a number of function blocks may be done at the same time.

The base minimum time, period or duration for these function blocks may be regarded as 5 seconds. The second execution of this function block could be at 10 seconds, a multiple of two times the base time. The second execution may occur at 10 seconds, the third execution at 15 seconds, the fourth at 20 seconds, and so on.

Figure 2:
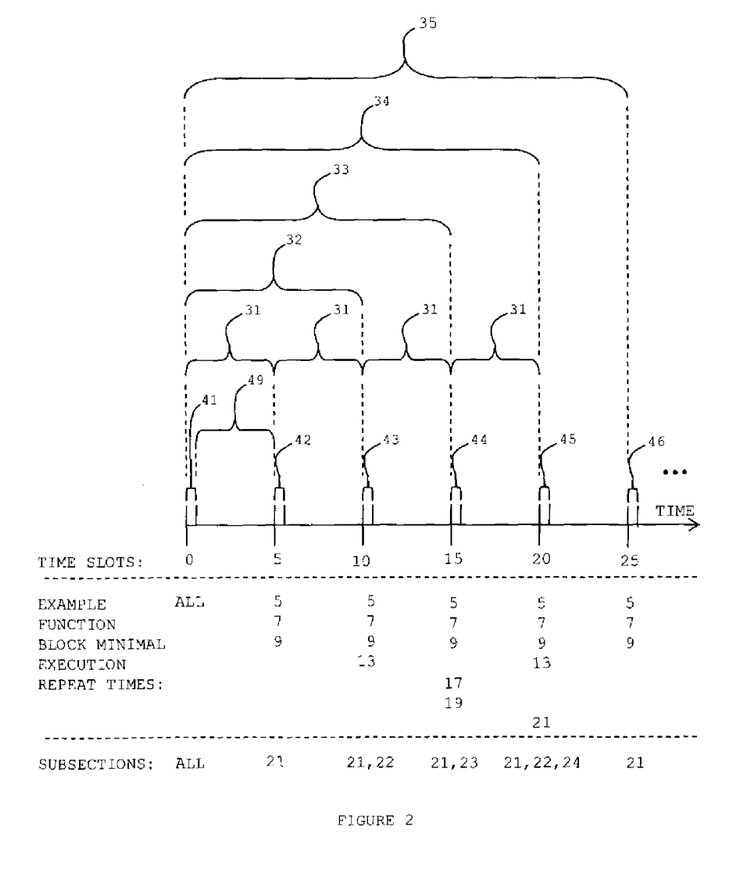
FIG. 2 is a diagram showing an example of times for function block executions.

FIG. 2 is a diagram showing an example of times for function block executions. A function block with 5 second repeat execution time may in a subsection 21 of FIG. 1 with the base time represented by a time span 31 from 0 to 5 seconds in FIG. 2. Subsection 21 may have function blocks with maximum repeat times of 5, 7 and 9 seconds, respectively. Subsection 22 may have function blocks with repeat times of 13 seconds, respectively. Subsection 23 may have function blocks with repeat times of 17 and 19 seconds, respectively. Subsection 24 may have function blocks with repeat times of 21 seconds, respectively, and so on with respect to function blocks with repeat times greater than 25 seconds.

For instance, virtually all functions blocks may be initially executed at a time period 41. Period 41 may be very short and be negligible relative to a maximum of 5 seconds permitted before a needed repeated execution. The remaining time 49 of time span 31 may be dead time preceding the next execution of function blocks at period 42. At period 42, the function blocks not needing to be executed for at least about 5 seconds but within 10 seconds may be executed at period 42. These may include the example function blocks which have needed repeat execution times of 5, 7 and 9 seconds, since period 43 at 10 seconds would be too long for a viable repeat execution for these function blocks. The example function blocks having the minimum execution repeat times of 13 and 14 seconds may be executed for a second time at period 43 which is for a block having a repeat time of 15 seconds or less. The blocks with minimum repeat times of 5, 7 and 9 seconds may be executed for a third time at period 43. The multiple of two times the base time may be represented by a time span 32. The multiple of three times the base time may be indicated by a time span 33. The example function blocks having the minimum execution repeat times of 17 and 19 seconds may be executed for a second time at period 44 which is for a block having a repeat time of 20 seconds or less. The multiple of four times the base time may be indicated by a time span 34. The example function block having the minimum execution repeat time of 21 seconds may be executed for a second time at period 45 which is for a block having a repeat time greater of 25 seconds or less. The multiple of five times the base time may be indicated by a time span 35. Another set of function block execute times may occur at period 46, and so on at additional periods. Alternatively, the execution of the function blocks may restart at period 41 with all of them being executed and their repeated executions continuing through period 45, and starting 5 seconds later at period 42. All of the stated times and/or values are for illustrative purposes, and may be any other set of times and/or values.

Figure 3:
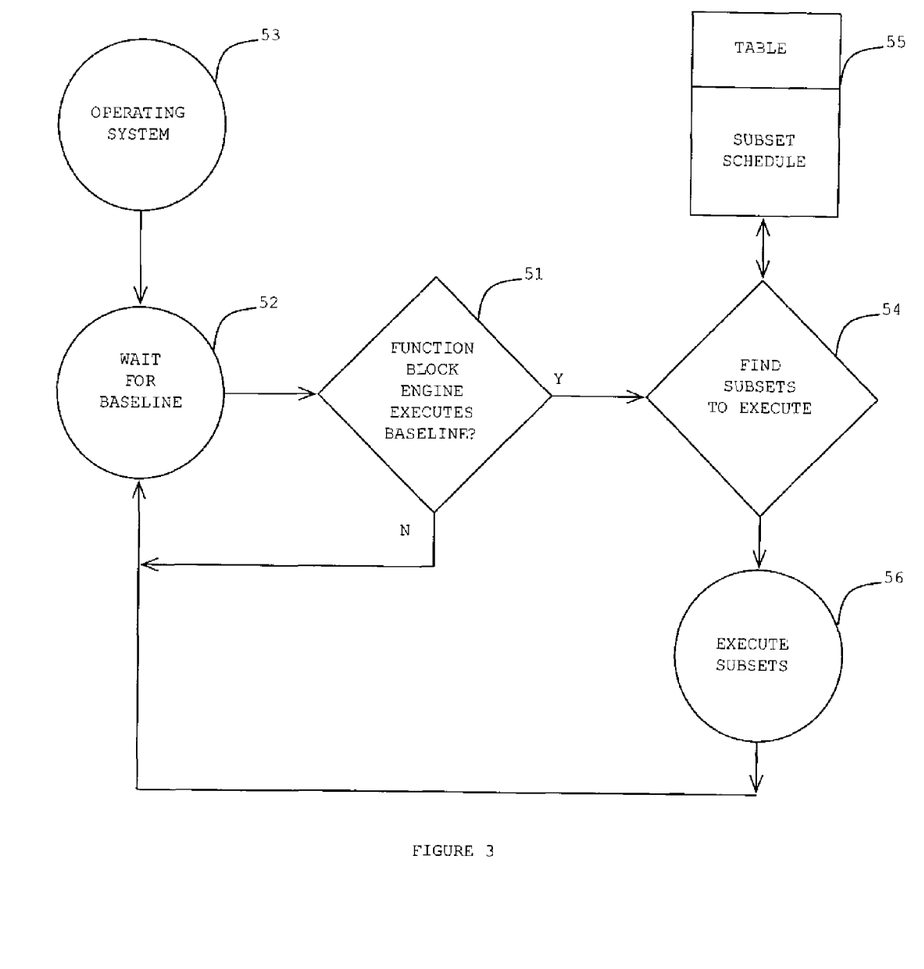
FIG. 3 is a diagram of a basic pattern of an example operation involved in the present approach.

FIG. 3 is a diagram of a basic pattern of an example operation involved in the present approach. At symbol 51, a function block engine may execute a baseline if it has one. If not, then there may be a wait for the baseline at symbol 52. The baseline may come from an operating system at symbol 53. Once a baseline is received, then the function block engine may execute the baseline at symbol 51. Subsections for execution need to be found at symbol 54. The subsections may be found at table 55 which has a subsection schedule. Once the subsections are found, the subsections may be executed at symbol 56. Upon execution of the subsections, there may be at symbol 52 a wait for a baseline from the operating system at symbol 53.

The present approach may implement a sub-loop execution task (SLET) that sits between the operating system (OS) task scheduler and the function block execution engine. For simplicity, an example implementation may be with an assumption that the sub-loop execution task is called once a second from the operating system and is table driven. The application programmer (through the tool) may have an ability to specify a base rate A (in seconds) that will be the fastest rate at which any of the blocks will be periodically run. Other periods (execution rates) may be specified as a multiplier (integer) B of the base rate A. The multiplier specified for the period may define how many execution subsections will be available at that rate. That is, for a period with multiplier B, there may be up to B execution subsections. This means, for example, if the base rate is 30 seconds and if a single additional period is selected with the multiplier of 4 (i.e., period 4), there may be up to four subsections. Every 30 seconds, the blocks assigned to the base rate and the one subsection of blocks assigned to period 4 may be executed in a round robin fashion. Essentially, this may imply that each of the subsections assigned to the period 4 get executed every 4*30 seconds.

Figure 4:
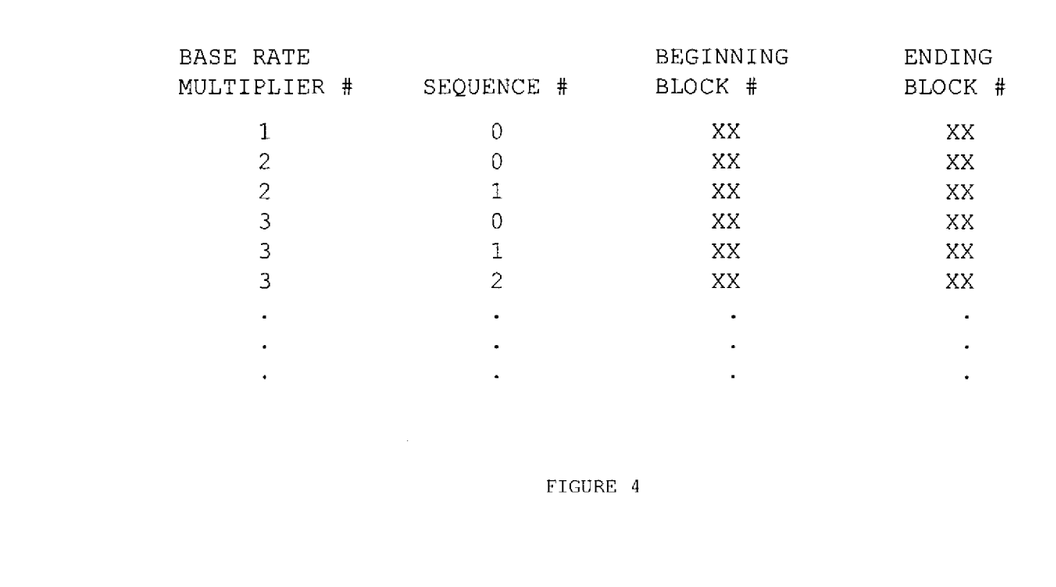
FIG. 4 is a diagram of an implementation which involves a sub-loop table specified by an application developer.

The implementation may involve a single table called sub-loop table (SLT) specified by an application developer which contains base rate multiplier, the sequence number (subsection number), the beginning block number and end block number as shown in FIG. 4.

A function block engine programming tool that allows access to the distributed execution framework should provide an approach for a user, per project, to define the base execution rate, the number of periods, and the period timings (i.e., fill in the sub-loop table).

The loop execution task (LET) may involve the following items. It may handle time multiplexing of an application by periodic calls to subsections of the control program. Each time a loop execution task is called, it may look up the sub-loop task table to determine which set of blocks need to be executed based on a time counter.

Each subsection of a period may be called once every period multiple times in a round robin fashion based on a period table ordering.

The number of blocks for a sequence within a period may be zero; in which case only the base rate blocks are executed.

Figure 5:
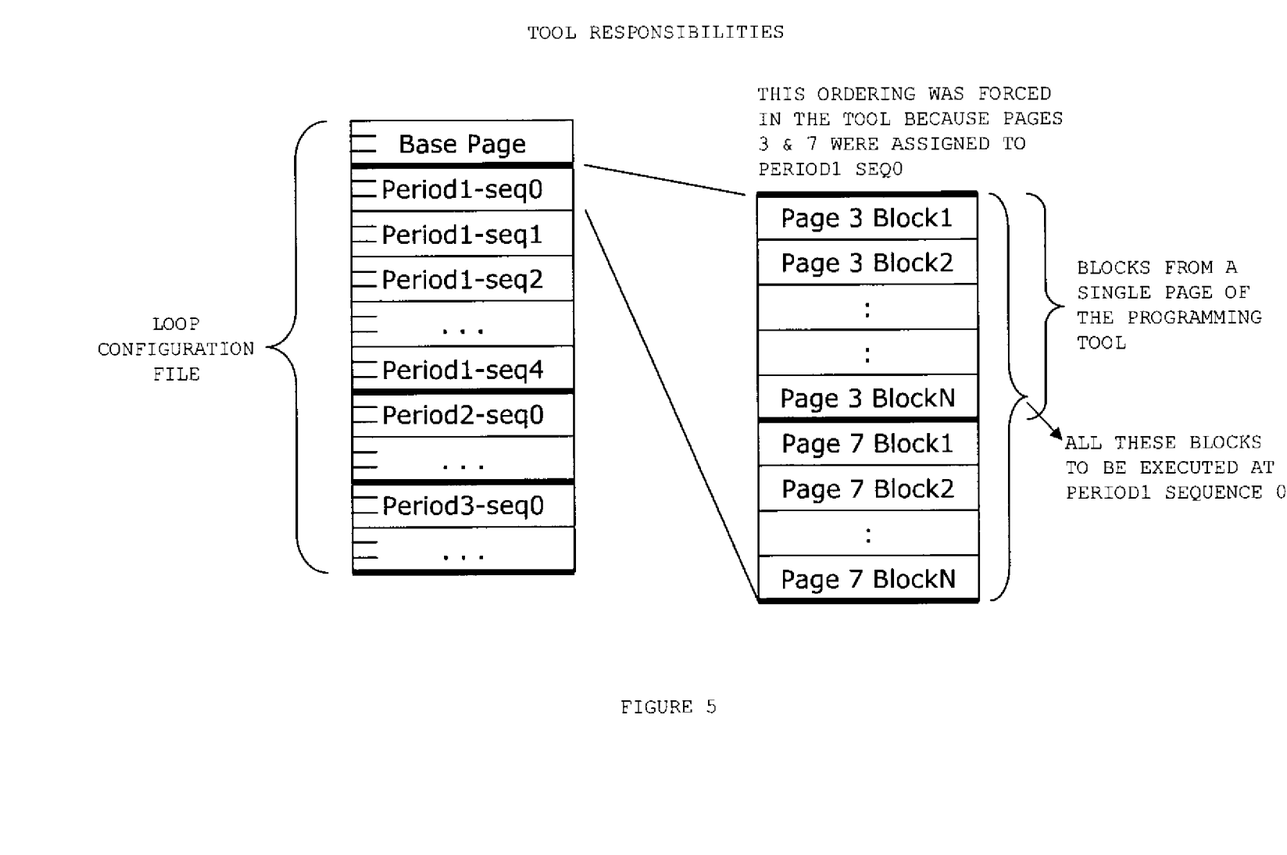
FIG. 5 is a diagram of a general configuration file block execution ordering rules.

Tool responsibilities may involve the following items. A single loop configuration file may still be generated where a block order is the execution order for the "On Demand" execution. Sub-loops that are called by the sub-loop execution task may be contiguous subsections of the entire configuration file. This means that the programmer may assign each "page" (or "container" or other visual programming method to capture subsets of logic) of the control program to a specific period number and sequence number. Multiple pages may be assigned to the same period and sequence number; in which case the tool may control the block ordering such that the blocks on these pages will be concatenated (i.e., linked together in an order) with the lowest number page's blocks first. As blocks are added to a page, the tool may sort virtually all of the blocks on subsequent pages (e.g., move them all down) to enforce the ordering rules. General configuration file block ordering rules may be derived from the sub-loop table (i.e., Base Page, Period1-seq0, Period1-seq2, . . . , Period1-seq4, Period2-seq0, . . . , Period3-seq4). One may refer to FIG. 5.

Figure 6:
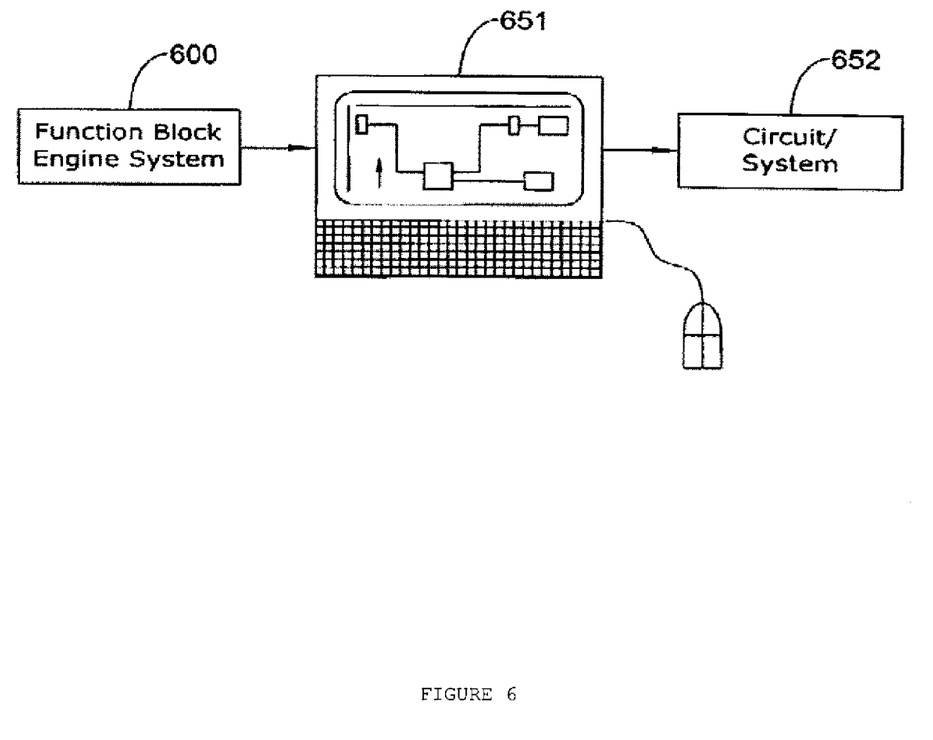
FIG. 6 is a diagram of a relationship of the function block engine system, computer and resulting control logic or system.

The function block engine may be noted in other contexts. FIG. 6 is a diagram showing relationship of the function block engine system 600, computer 651 and resulting control logic or system 652. One may take the present function block engine system 600, perhaps on a memory medium (e.g., disk, FLASH, stick, or the like) to store and/or load it into a memory of an operating system such as that of a personal computer 651. One may design control logic or system 652, for example, a controller, with the function block engine system 600. That control logic or system 652 may be put into a memory, for instance, in microcode, or another code, manner or mode. The memory with the system 652 may be tied in with an operating system to provide the activity of a controller having the connections with the hardware or other to be controlled and monitored based on the function block designed system 652.

Figure 7:
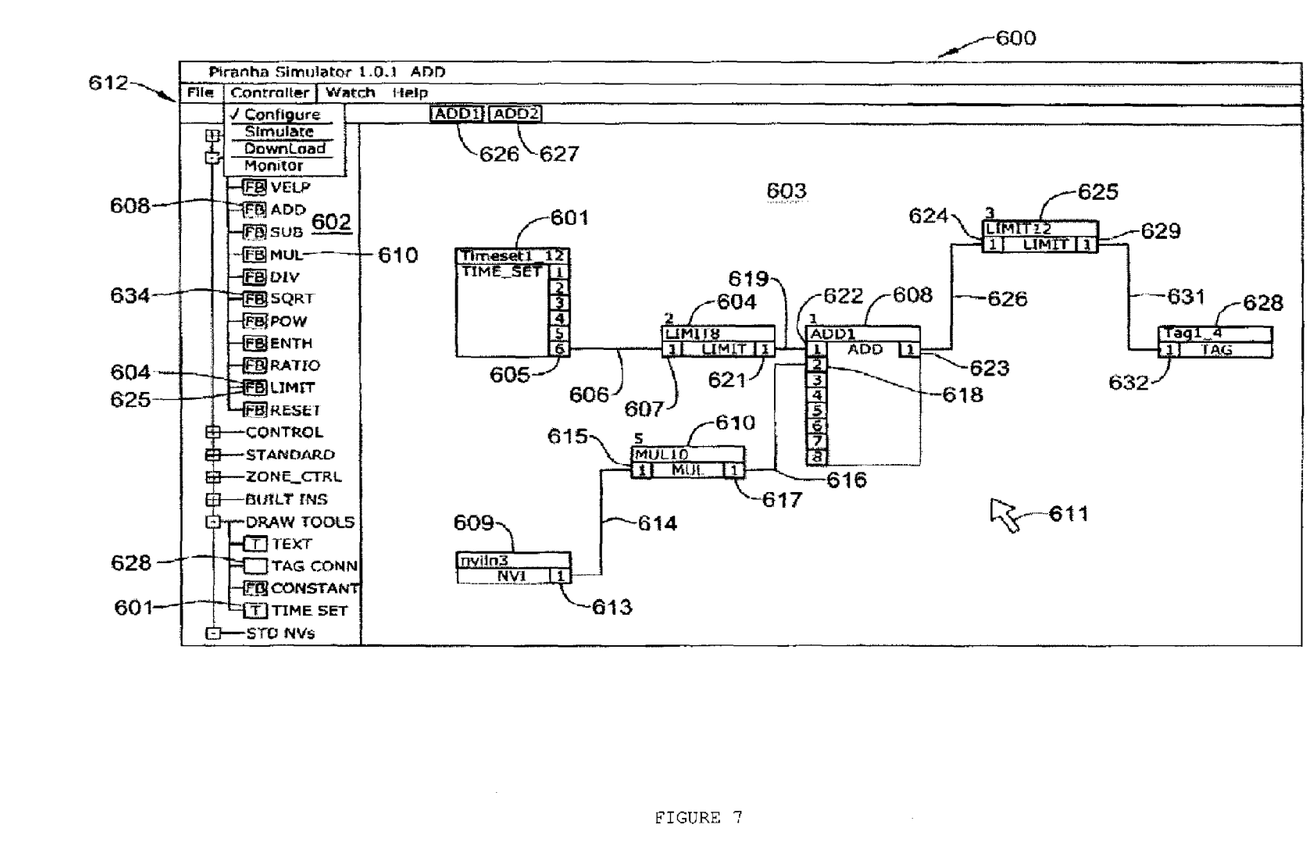
FIG. 7 shows a display screen set up for designing control logic or systems with function blocks.
Figure 8:
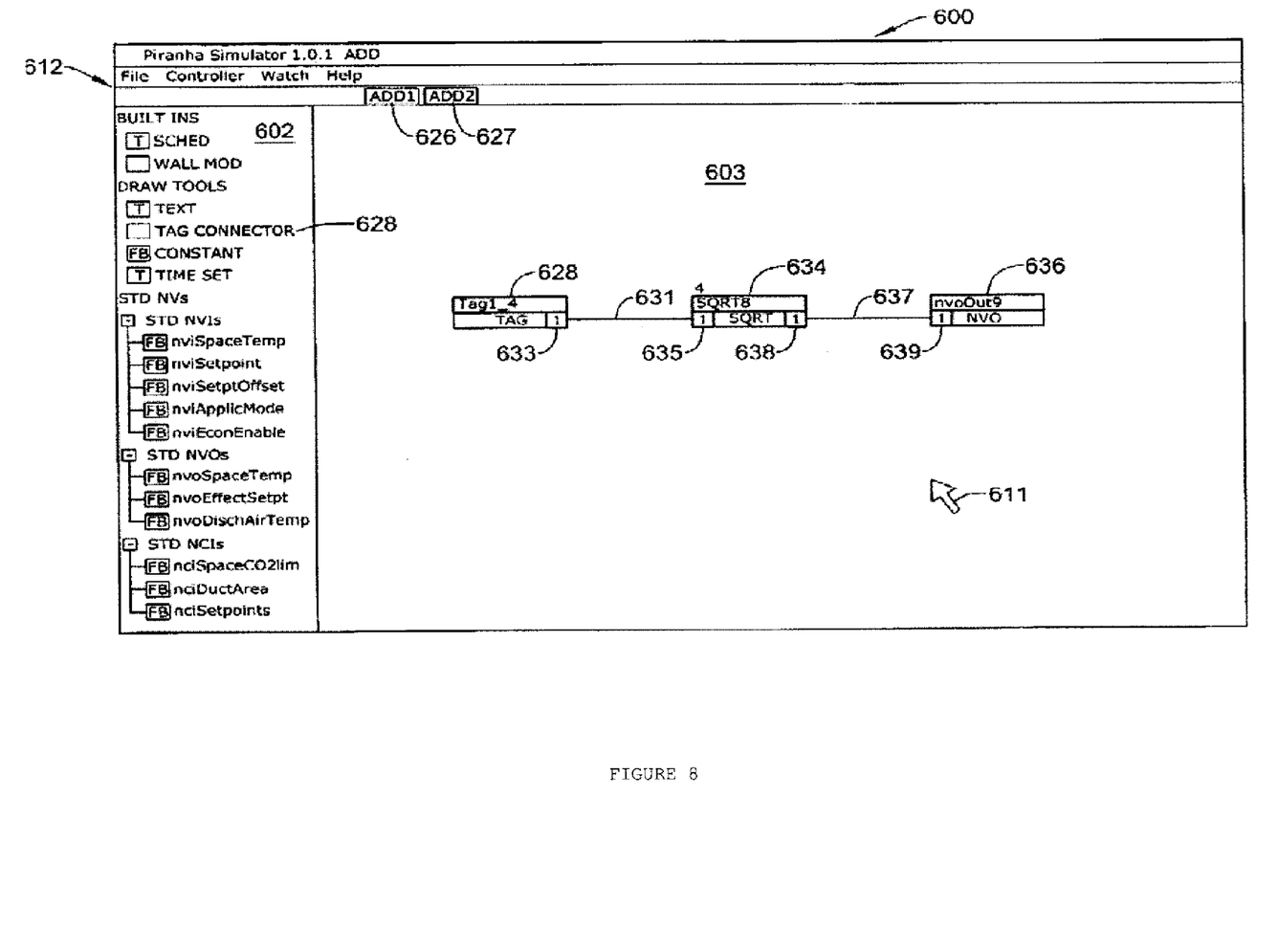
FIG. 8 shows a second page of the screen of FIG. 7.
Figure 9:
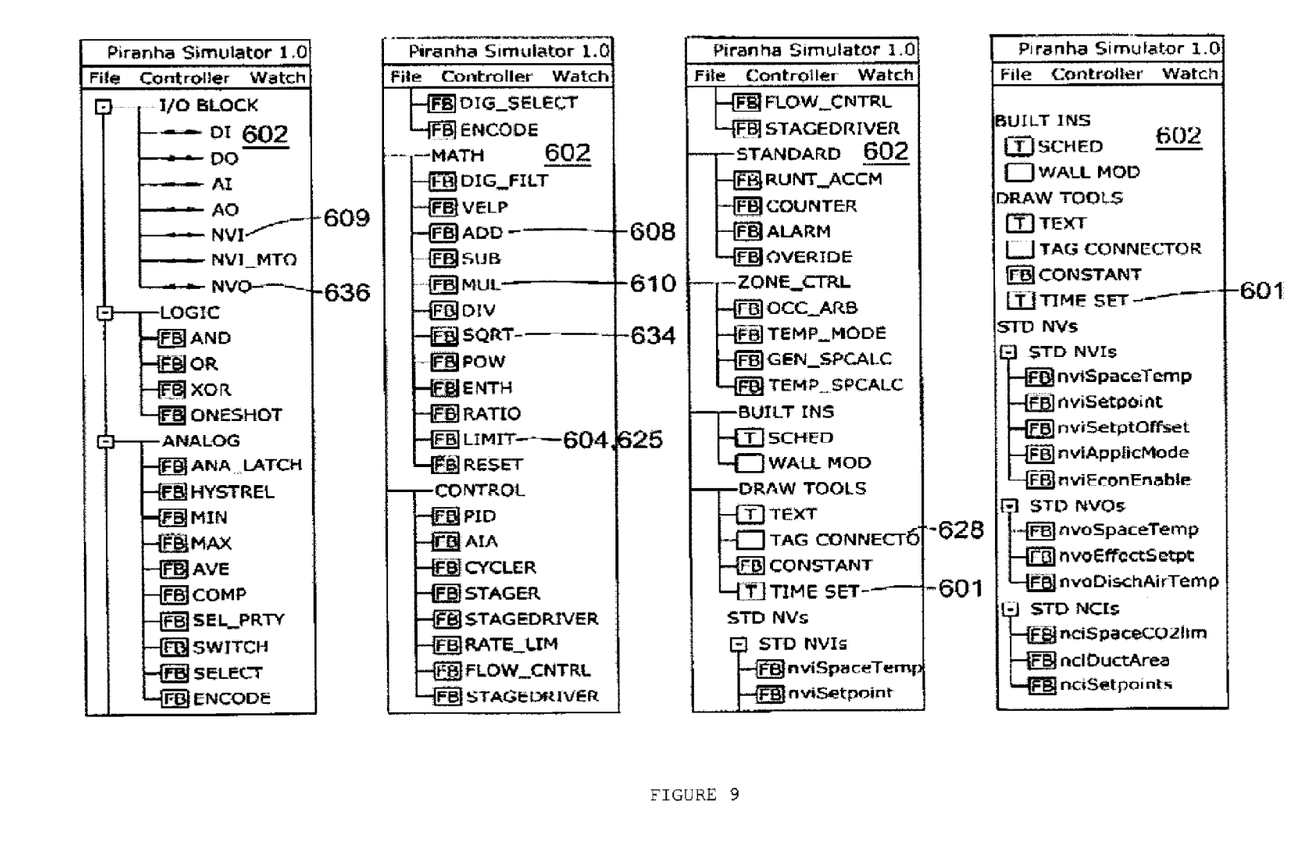
FIG. 9 shows from the screen a partial list of function blocks and other items that may be used in designing control logic or a system.

FIGS. 7-9 show an operation for designing simple example system 652 with the function block engine system 600. This operation may be implemented in a system designer and simulator on a personal computer 651 with software such as, for example, "Microsoft Windows XP Professional™". One may have a screen like that shown in FIG. 7. A mouse may be used to move an arrow 611 to click on "controller" and then on "configure" of the tool bar 612. Then one may, for example, click and drag out a function block 601 entitled "Timeset" from function block source area 602 into an area 603 of a display screen with the mouse arrow 611. Even though a function block 601, for instance, may be dragged from area 602 to area 603, the source 601 of the function block would remain in area 602. Then one may drag a Limit 604 from area 602 to area 603. One may place the mouse arrow 611 on an output terminal 605 of block 601 and drag a connection 606 to an input terminal 607 of limit 604. An add function block 608 may be dragged from area 602 to area 603. A network variable input block 609 may be dragged with the mouse arrow 611 into area 603. A multiply function block 610 may be dragged from area 602 to area 603. The mouse arrow 611 may be placed and clicked on a terminal 613 of block 609 and a line 614 may be dragged from terminal 613 to a terminal 615 of function block 610 to make a connection between block 610 and input 609. In a similar manner a line 616 may be dragged from an output terminal 617 of block 610 to an input terminal 618 of block 608. Also, a connection may be made with a line 619 from an output terminal 621 of limit block 604 to an input terminal 622 of the add block 608. The add function block 608 may add input values at terminals 618 and 622 to result in a sum at an output terminal 623 of block 608. The output at terminal 623 may be provided to an input terminal 624 of another limit function block 625 with a line 626. The source of limit function block 625 may be the same as that for limit function block 604 which is from area 602. To check the inputs of add function block 608, one may right click the mouse and click on edit to get a dialogue box that shows the inputs which may changed to one or more parameters with values placed in them in lieu of inputs to the add function block 608. The same may be done for the multiply function block 610 where one input is replaced with a parameter of four which can be multiplied with a value at input at 615 to get a result at terminal 617. Also, other things, such as function block names, may be changed in this right-clicked edit dialogue box.

The control logic or system design with function blocks in area 603 may continue on to another page as shown in the tool bar 612. The pages may be relabeled, for example, as page 1 was relabeled as ADD1 at place 626 and page 2 was relabeled as ADD2 at place 627. The control logic or system may be continued on to the next page ADD2 with a TAG connection block 628, which can be dragged with the arrow 611 from the block source area 602 to area 603. An output terminal 629 of block 625 may be connected with a line 631 dragged out with arrow 611 from terminal 629 to a terminal 632 of tag block 628.

FIG. 8 shows a continuation of the control logic or system from page ADD1 to page ADD2. Tag 628 may be a continuation of line 631 via input terminal 632 and an output terminal 633 of tag 628 in FIG. 8. A square root function block 634 may be dragged from area 602 to area 603 of the display. The line 631 connection may be dragged with the arrow 611 from terminal 633 to an input terminal 635 of the square root function block 634. A network variable output 636 may be dragged from area 602 into area 603 of the display with the mouse arrow 611. A connection line 637 may be dragged from an output terminal 638 of block 634 to a terminal 639 of output block 636.

The ADD1 626 and ADD 627 pages may themselves be placed into logical "macro" function blocks with their respective inputs and outputs. The block of pages 626 and 627 may be placed into one user defined macro function block. If there are other macro function blocks having a number of pages of control logic made from various function blocks, they also may be combined into a macro function block. These macro function blocks might be interconnected and also combined into still another larger macro function block. This hierarchical progression of function blocks being combined may continue until an entire system of a design is in one macro block, such as aircraft instrumentation, an industrial plant, HVAC or some other kind of controller. The resulting macro function block might be treated as a black box in some instances.

FIG. 9 shows a list of function blocks and terminals in area 602 of the display that may be selected for developing various kinds of designs. The list is not inclusive in that other function blocks and terminals may be added.

Figure 10:
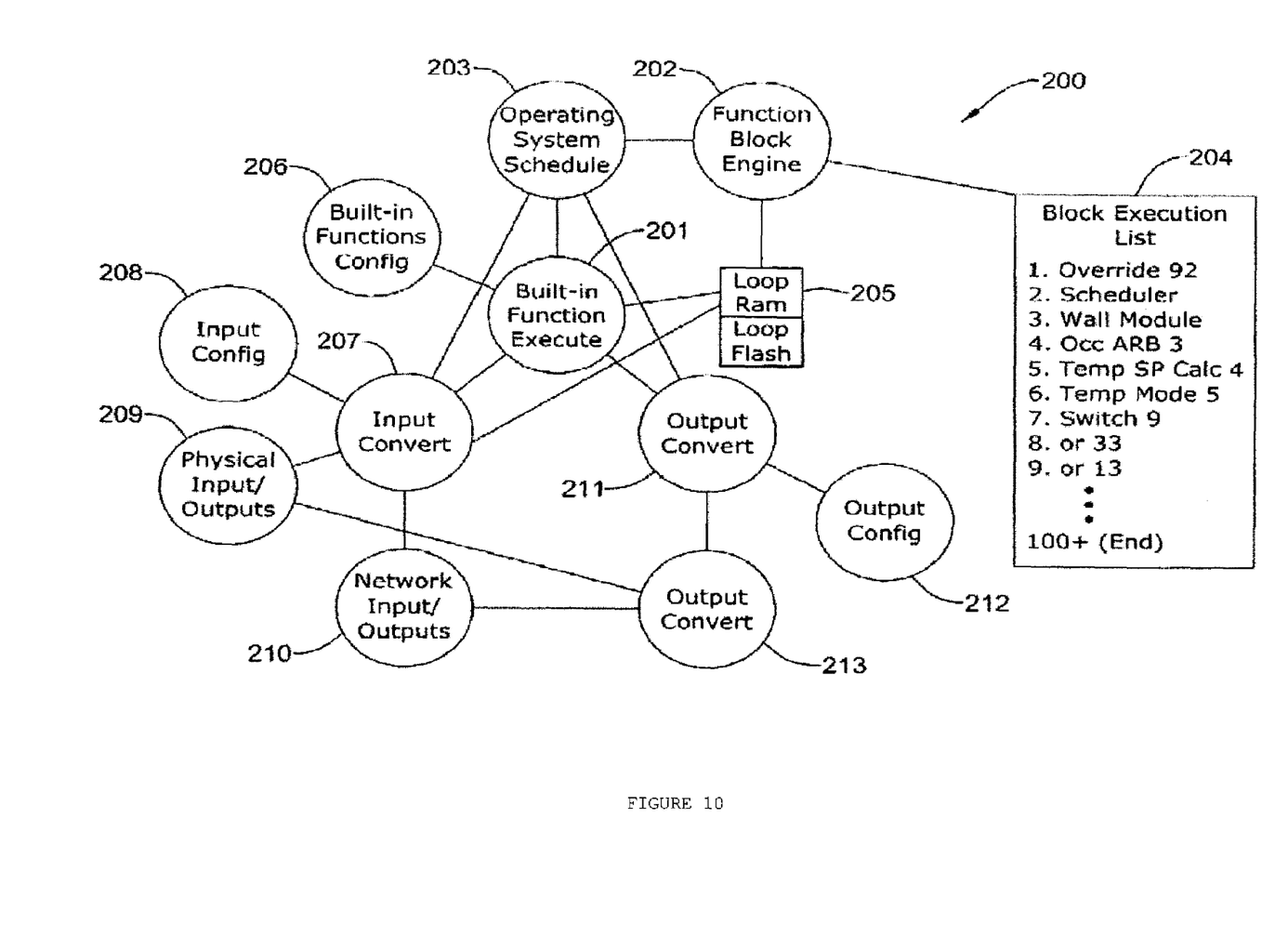
FIG. 10 is a diagram of components of a function block system.

FIG. 10 is a diagram of a function block system 200 which may have application to any control system. Built-in function execute 201 may be connected to operating system schedule 203, loop RAM/FLASH 205, built-in functions configuration 206, input converter 207, and output converter 211. Function block engine 202 may be connected to operating system schedule 203, block execution list 204, and loop RAM/FLASH 205. Operating system schedule 203 is connected to input converter 207 and output converter 211. Input converter 207 is connected to loop RAM/FLASH 205, input configuration 208, physical input/outputs 209, and network input/outputs 210. Output converter 211 is connected to output configuration 212 and output converter 213. Output converter 213 is connected to physical input/outputs 209 and network input/outputs 210.

To recap, a function block execution framework may incorporate a function block engine 11, a function block library 13 having function blocks which are selected by the function block engine for control logic, and a schedule mechanism 12 connected to the function block engine (FIG. 1). The schedule mechanism may provide to each function block in the control logic a periodic execution at a maximum time between successive executions of the respective function block that is sufficiently short enough to maintain an active functionality of the respective function block. A periodic execution at a maximum time between successive executions of a function block that is sufficiently short enough to maintain an active functionality of the function block may be regarded as an execution time of the function block.

The execution times of the function blocks may be indicated by a plurality of time slots from the schedule mechanism. Each execution time of the function blocks may be within at least one time slot of the plurality of time slots. Each time slot may incorporate a base time and a multiplier of the base time. The base time may be the smallest execution time of the execution times of the function blocks. The multiplier may be an integer selected from a range of 1 to N.

Each slot of virtually all of the slots may incorporate a base time. The slots may be in series in that a first slot has a duration equal to the base time, a second slot has a duration equal to the base time, which begins at an end of the duration of the first slot, a third slot has a duration equal to the base time, which starts at an end of the duration of the second slot, and an nth slot has a duration equal to the base time, which starts at an end of a duration of an (n−1)th slot. N may represent a total number of slots and n may represent a number of a slot from 1 to N.

A function block may be executed at a time when the active functionality of the respective function block is needed.

An approach for executing function blocks may incorporate receiving 52 a baseline from an operating system 53, 14, executing 51 the baseline with a function block engine 11, selecting 54 a set of function blocks needed by the function block engine from a library 13, determining 54 subsets of function blocks from the set of function blocks according to execution times 55, executing 56 the subsets of function blocks, and waiting 52 for another baseline if the function block engine is not executing a baseline (FIGS. 1 and 3).

An execution time may be a maximum duration that a function block can sustain an active status before needing another execution. A subset may incorporate function blocks that have execution times within a range of maximum durations of time. The subset of function blocks may have executions periodically repeated of the function blocks within the range of maximum durations of time of the subset so the function blocks of that subset can sustain an active status.

Subsets of function blocks may be executed sequentially according to a schedule determined by ranges of maximum durations of time, respectively. The subsets of function blocks may be continually executed according to the schedule for sustaining continuous operation by the function blocks.

Each subset of function blocks to be executed may be determined by a subset schedule connected to the set of function blocks. The subset schedule may have N time slots corresponding to N subsets. n may be a time slot from a 1st time slot through an Nth time slot. The baseline may be a duration of A. The first time slot may have a duration of A. An $n^{th}$ time slot may have a duration of nA.

The subset of function blocks may have executions periodically repeated within the certain range of the maximum durations of time of the subset so that the function blocks sustain an active status as needed. The function blocks having executions scheduled in each time slot may be executed at about the same time within the time slot by a processor. An amount of time for an execution of one or more function blocks may be a fraction of a total amount of time in the respective time slot. An amount of time remaining in the respective time slot, after the function blocks with executions scheduled in the respective time slot have been effected, may need no operation of the processor.

Each time slot may have an execution scheduled for one or more function blocks. Alternatively, each time slot may be regarded as having an execution scheduled for more or less than one function block. Each function block within an nth time slot and each function block within the slots preceding the nth slot having a need for repeat executions may be executed during a duration of the 1st time slot through the nth slot.

One or more function blocks of a 1st time slot may be executed at each duration of A. One or more function blocks of a 2nd time slot may be executed at each duration of 2A. One or more function blocks of an nth slot may be executed at each duration of nA. One or more function blocks may be executed at each duration of more than one time slot.

A function block periodic execution framework may incorporate a function block engine 11, a table 12 of function blocks connected to the function block engine, and a schedule menu mechanism 12 connected to the table of function blocks (FIG. 1). The function blocks in the table may be selected by the function block engine from a library 13 of function blocks for use in control logic. The schedule menu mechanism may incorporate a list of the function blocks from the table of function blocks and a maximum amount of time under which that each function block can continually operate between two adjacent sequential executions of the respective function block. The schedule mechanism may categorize the list of function blocks into sub-lists of function blocks according to ranges of the maximum amount of time that each function block can continually operate between two adjacent sequential executions. Each of the function blocks may be executed only when a need for an active status of the function block is needed for use by the function block engine in the control logic.

Patent documents related to the present disclosure may incorporate U.S. Pat. No. 7,653,459, issued Jan. 26, 2010, and entitled "VAV Flow Velocity Calibration and Balancing System"; U.S. Pat. No. 7,826,929, issued Nov. 2, 2010, and entitled "Low Cost Programmable HVAC Controller Having Limited Memory Resource"; U.S. Patent Application Publication No. 2008/0004725, published Jan. 3, 2008, and entitled "Generic User Interface System"; U.S. Patent Application Publication No. 2008/0010049, published Jan. 10, 2008, and entitled "Graphic Language Compiler System"; U.S. Patent Application Publication 2008/0016493, published Jan. 17, 2008, and entitled "System Level Function Block Engine"; and U.S. Patent Application Publication 2009/0113037, published Apr. 30, 2009, and entitled "Interoperable Network Programmable Controller Generation System"; all of which are hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A function block execution framework comprising:
a processor having a memory, the processor including:
    a function block engine;
    a function block library having function blocks, the function blocks configured to be selected by the function block engine and interconnected to form a control logic, the function blocks each having a minimum required time between successive periodic executions to maintain an active functionality of the respective function block; and
    a schedule mechanism connected to the function block engine; and
    wherein
    the function blocks are categorized into one or more subsections according to their respective minimum required time between successive periodic executions;
    wherein the schedule mechanism comprises a list of the function blocks and a maximum amount of time under which each function block can continually operate between two adjacent sequential execution of a respective function block and provides to each function block in the control logic an execution time that is a periodic execution at the maximum time between successive executions of the respective function block that is less than the minimum time required to maintain an active functionality of the respective function block such that each subsection of a period may be called once every period multiple times based on a period table ordering;

wherein the execution times of the function blocks are indicated by a plurality of time slots from the schedule mechanism;

wherein each time slot comprises a base time that is a smallest execution time of the execution times of the function blocks; and wherein the plurality of time slots are in series in that a first slot has a duration equal to a base time, a second slot has a duration equal to the base time, which begins at an end of the duration of the first slot, a third slot has a duration equal to the base time, which starts at an end of the duration of the second slot, and an nth slot has a duration equal to the base time, which starts at an end of a duration of an (n−1)th slot;

N represents a total number of slots; and n represents a number of a slot from 1 to N.

2. The framework of claim 1, wherein each execution time of the function blocks is within at least one time slot of the plurality of time slots.

3. The framework of claim 1, wherein each time slot comprises:

a multiplier of the base time.

4. The framework of claim 3, wherein the multiplier is an integer selected from a range of 1 to N.

5. The framework of claim 1, wherein a function block is executed at a time when the active functionality of the respective function block is needed.

6. A method for executing function blocks, comprising:

providing a processor having a memory, the processor capable of:

receiving a baseline from an operating system including a base rate and a multiplier;

executing the baseline with a function block engine;

selecting a set of function blocks needed by the function block engine from a library, the function blocks each having a minimum required time between successive periodic executions to maintain an active functionality of the respective function block;

determining subsets of function blocks from the set of function blocks according to the execution times corresponding to the minimum time between successive periodic executions of the respective function block and a multiplier;

executing the subsets of function blocks in a repeating sequential order; and waiting for another baseline if the function block engine is not executing a baseline; and wherein:

an execution time is a maximum duration that a function block can sustain an active status before needing another execution;

a subset comprises function blocks that have execution times within a range of maximum durations of time;

the subset of function blocks has executions periodically repeated of the function blocks within the range of maximum durations of time of the subset so the function blocks of that subset can sustain an active status;

each subset of function blocks to be executed is determined by a subset schedule connected to the set of function blocks;

the subset schedule comprises N time slots corresponding to N subsets;

n is a time slot from a 1st time slot through an Nth time slot;

the baseline is a duration of A;

a first time slot comprises a duration of A;

an $n^{th}$ time slot comprises a duration of nA; and the subset of function blocks have executions periodically repeated within the range of the maximum durations of time of the subset so that the function blocks sustain an active status as needed.

7. The method of claim 6, wherein subsets of function blocks are executed sequentially according to a schedule determined by ranges of maximum durations of time, respectively.

8. The method of claim 7, wherein the subsets of function blocks are continually executed according to the schedule for sustaining continuous operation by the function blocks.

9. The method of claim 6, wherein:

the function blocks having executions scheduled in each time slot are executed at about the same time within the time slot by the processor; and an amount of time for an execution of one or more function blocks is a fraction of a total amount of time in a respective time slot; and an amount of time remaining in the respective time slot, after the function blocks with executions scheduled in the respective time slot have been effected, needs no operation of the processor.

10. The method of claim 9, wherein each time slot has an execution scheduled for one or more function blocks.

11. The method of claim 9, wherein each function block within an nth time slot and each function block within the time slots preceding the nth slot having a need for repeat executions are executed during a duration of the 1st time slot through the nth slot.

12. The method of claim 6, wherein:

one or more function blocks of a 1st time slot are executed at each duration of A;

one or more function blocks of a 2nd time slot are executed at each duration of 2A;

one or more function blocks of an nth slot are executed at each duration of nA; and one or more function blocks are executed at each duration of more than one time slot.

13. A function block periodic execution framework comprising:

a processor having a memory, the processor including:

a function block engine;

a table of function blocks connected to the function block engine;

a sub-loop table including a base rate multiplier, a subsection number, a beginning block number, and an end block number; and a schedule menu mechanism connected to the table of function blocks; and wherein:

the function blocks in the table are selected by the function block engine from a library of function blocks and interconnected to form a control logic; and the schedule menu mechanism comprises a list of the function blocks from the table of function blocks and a maximum amount of time under which that each function block can continually operate between two adjacent sequential executions of a respective function block; and wherein schedule menu mechanism categorizes the list of function blocks into subsections of function blocks according to ranges of the maximum amount of time that each function block can continually operate between two adjacent sequential executions and the schedule mechanism schedules the execution of the subsections of function blocks such that a periodic execution is achieved to maintain active functionality of the function blocks; and wherein the processor is configured to access the sub-loop table to determine which function blocks need to be executed based on a time counter.

14. The framework of claim 13, wherein each of the function blocks is executed only when a need for an active status of the function block is needed for use by the function block engine in the control logic.

* * * * *